United States Patent
Hodges

(10) Patent No.: US 11,681,308 B2
(45) Date of Patent: *Jun. 20, 2023

(54) EXCESS FLOW AND THERMAL VALVE

(71) Applicant: BrassCraft Manufacturing Company, Novi, MI (US)

(72) Inventor: Daniel Hodges, Novi, MI (US)

(73) Assignee: BRASSCRAFT MANUFACTURING COMPANY, Novi, MI (US)

(*) Notice: Subject to any disclaimer, the term of this patent is extended or adjusted under 35 U.S.C. 154(b) by 8 days.

This patent is subject to a terminal disclaimer.

(21) Appl. No.: 17/090,445

(22) Filed: Nov. 5, 2020

(65) Prior Publication Data
US 2021/0055748 A1 Feb. 25, 2021

Related U.S. Application Data

(62) Division of application No. 16/155,923, filed on Oct. 10, 2018, now Pat. No. 10,877,498.

(60) Provisional application No. 62/577,816, filed on Oct. 27, 2017.

(51) Int. Cl.
G05D 23/02 (2006.01)
G05D 7/01 (2006.01)

(52) U.S. Cl.
CPC .......... G05D 23/022 (2013.01); G05D 7/012 (2013.01); G05D 23/028 (2013.01)

(58) Field of Classification Search
CPC .... G05D 23/022; G05D 7/012; G05D 23/028; F16K 17/24; F16K 17/205; F16K 7/17; F16K 15/144; Y10T 137/7866; Y10T 137/7869

See application file for complete search history.

(56) References Cited

U.S. PATENT DOCUMENTS

| | | | |
|---|---|---|---|
| 2,765,803 A | 10/1956 | Dykzeul et al. | |
| 3,794,077 A | 2/1974 | Fanshier | |
| 3,872,884 A | 3/1975 | Busdiecker et al. | |
| 3,904,111 A | 9/1975 | Petersson | |
| 4,072,159 A | 2/1978 | Kurosawa | |
| 4,108,197 A | 8/1978 | Brakebill | |
| 4,280,523 A | 7/1981 | Norton | |
| 4,290,440 A | 9/1981 | Sturgis | |
| 4,508,144 A * | 4/1985 | Bernett .................. | G05D 7/012 138/45 |

(Continued)

FOREIGN PATENT DOCUMENTS

| | | |
|---|---|---|
| CN | 104265965 A | 1/2015 |
| DE | 3932900 A1 | 2/1991 |

(Continued)

OTHER PUBLICATIONS

Supply House Times, SmartSense Ad, Nov. 2016, pp. 1-2.

(Continued)

*Primary Examiner* — Kun Kai Ma
(74) *Attorney, Agent, or Firm* — Reising Ethington P.C.

(57) ABSTRACT

An excess flow and thermal valve assembly includes a valve housing, a valve carried in the housing and displaceable during excess flow conditions to reduce flow of fluid through the assembly, and an intumescent or intumescent material carried in the valve housing and expandable during excess temperature conditions to reduce flow of fluid through the assembly.

15 Claims, 3 Drawing Sheets

(56) References Cited

U.S. PATENT DOCUMENTS

| | | | |
|---|---|---|---|
| 4,648,418 A | 3/1987 | Scobie et al. |
| 4,649,949 A | 3/1987 | Scobie et al. |
| 4,651,763 A | 3/1987 | Scobie et al. |
| 4,681,256 A | 7/1987 | Dewhirst |
| 4,727,903 A | 3/1988 | Sturgis et al. |
| 4,825,893 A | 5/1989 | Gailey |
| 4,828,167 A | 5/1989 | Kuze |
| 4,969,482 A | 11/1990 | Perrin et al. |
| 4,974,623 A | 12/1990 | Sturgis |
| 5,156,180 A | 10/1992 | Sturgis |
| 5,263,643 A | 11/1993 | Wells et al. |
| 5,365,963 A | 11/1994 | Hoffmann |
| 5,379,794 A | 1/1995 | Brown |
| 5,472,008 A | 12/1995 | Boarin |
| 5,582,201 A | 12/1996 | Lee et al. |
| 5,836,338 A | 11/1998 | Schulze |
| 5,855,355 A | 1/1999 | Grunert et al. |
| 6,746,761 B2 | 6/2004 | Janoff |
| 6,820,633 B2 | 11/2004 | Liu |
| 6,923,206 B2 * | 8/2005 | Glover ............. F16K 31/084 |
| | | | 137/454.2 |
| 7,178,548 B2 | 2/2007 | Abe |
| 7,434,595 B2 | 10/2008 | Schmitt |
| 7,562,668 B2 | 7/2009 | Mackay-Smith et al. |
| 7,913,926 B2 | 3/2011 | Goncze |
| 7,936,107 B2 | 5/2011 | Freeman et al. |
| 8,183,315 B2 | 5/2012 | Männle et al. |
| 8,602,048 B2 | 12/2013 | Radford et al. |
| 8,733,382 B2 | 5/2014 | Suess |
| 8,794,254 B2 | 8/2014 | Maier et al. |
| 9,151,402 B2 | 10/2015 | Risse |
| 9,163,616 B2 | 10/2015 | Maier et al. |
| 9,383,025 B2 | 7/2016 | Forrest et al. |
| 9,470,327 B2 | 10/2016 | Keith |
| 9,486,884 B2 | 11/2016 | Dominguez et al. |
| 9,494,241 B2 | 11/2016 | Mustafa |
| D776,428 S | 1/2017 | Grebinoski et al. |
| 9,702,473 B2 | 7/2017 | Nomichi et al. |
| 2004/0089349 A1 | 5/2004 | Meyer |
| 2004/0221893 A1 | 11/2004 | Johnson |
| 2007/0194137 A1 | 8/2007 | Goneze |
| 2008/0289695 A1 | 11/2008 | Holzer et al. |
| 2010/0108160 A1 | 5/2010 | Eichler |
| 2010/0139787 A1 | 6/2010 | Li |
| 2010/0224267 A1 | 9/2010 | Flomenblit et al. |
| 2011/0209769 A1 | 9/2011 | Chun |
| 2013/0025724 A1 | 1/2013 | Grebinoski et al. |
| 2013/0186494 A1 | 7/2013 | Geisei et al. |
| 2014/0097374 A1 | 4/2014 | Moon |
| 2014/0230907 A1 | 8/2014 | Tallos et al. |
| 2015/0075623 A1 | 3/2015 | Tokumaru |
| 2015/0192213 A1 | 7/2015 | Nomichi et al. |
| 2015/0219232 A1 | 8/2015 | Dominguez et al. |
| 2016/0018010 A1 | 1/2016 | Forrestal |
| 2016/0033051 A1 | 2/2016 | Barbato |
| 2016/0169399 A1 | 6/2016 | Querejeta Andueza |
| 2016/0273492 A1 | 9/2016 | Saleri |
| 2016/0319942 A1 | 11/2016 | Pelfrey et al. |
| 2016/0327172 A1 | 11/2016 | Diaz et al. |
| 2017/0130852 A1 | 5/2017 | Keith |
| 2018/0038502 A1 | 2/2018 | Tallos |
| 2019/0138032 A1 | 5/2019 | Shevgoor |

FOREIGN PATENT DOCUMENTS

| | | |
|---|---|---|
| DE | 4112473 A1 | 10/1992 |
| DE | 10135832 A1 | 2/2003 |
| EP | 2487470 A2 | 8/2012 |
| GB | 742955 A | 1/1956 |
| GB | 1094666 A | 12/1967 |
| JP | 2011064228 A | 3/2011 |

OTHER PUBLICATIONS www.phcppros.com/articles/1420-dormont-announces-smartsense-technology; "Dormont Announces SmartSense Technology", Oct. 13, 2016, pp. 1.

https://plumbingperspective.com/dormont-smartsense-technology, Dormont SmartSense Technology, "Plumbing Perspective", Oct. 13, 2016, pp. 1.

http://digital.bnpmedia.com/publication/?m=9440&i=355932&p=12&ver=html5, Supply House Times, vol. 59, No. 09, Nov. 2016, pp. 1-124.

https://www.watts.com/our-story/brands/smartsense, SmartSense, pp. 1.

https://www.youtube.com/watch?v=-M2C1S2iEkQ&feature=youtu.be, SmartSense Excess Flow Valve & Thermal Shutoff, Oct. 28, 2016, pp. 1.

Canadian Office Action corresponding to Canadian Application No. 3,020,550, dated Dec. 14, 2021, 7 pages.

Mexican Office Action corresponding to Mexican Application MX/a/2018/013188; dated Mar. 23, 2022; 7 pages.

* cited by examiner

EXCESS FLOW AND THERMAL VALVE

CROSS-REFERENCE TO RELATED APPLICATIONS

This application is a divisional of U.S. application Ser. No. 16/155,923, filed on Oct. 10, 2018 and published as U.S. Pub. No. 2019-0129454. The entire contents of each of the aforementioned applications are hereby incorporated by reference.

TECHNICAL FIELD

This disclosure relates generally to valves and, more particularly, to excess flow valves and, even more particularly, to excess flow and thermal valves.

BACKGROUND

A fluid conduit may include an excess flow valve (EFV) that automatically shuts off or otherwise reduces flow of fluid through the valve in response to a break or disconnect in the fluid conduit downstream of the valve. For example, a natural gas line for a stove may include an EFV to reduce escape of natural gas in the event that the line breaks or disconnects somewhere in the line downstream of the valve. Likewise, an excess flow and thermal valve or thermal excess flow valve (TEFV) additionally automatically reduces flow of fluid through the valve in response to excessive temperature. For instance, the natural gas line for the stove may include a TEFV to reduce escape of natural gas in the event of fire.

SUMMARY

An excess flow and thermal valve assembly includes a valve housing, a valve carried in the housing and displaceable during excess flow conditions to reduce flow of fluid through the assembly, and an intumescent or intumescent material carried in the valve housing and expandable during excess temperature conditions to reduce flow of fluid through the assembly.

DETAILED DESCRIPTION

In general, illustrative embodiments of excess flow and thermal valve assemblies will be described using one or more illustrative embodiments of unique configurations of valve related components and valve housings. The illustrative embodiments will be described with reference to use in natural gas lines. However, it will be appreciated as the description proceeds that the disclosed subject matter is useful in many different applications and may be implemented in many other embodiments, including other types of gas lines.

Figure 1:
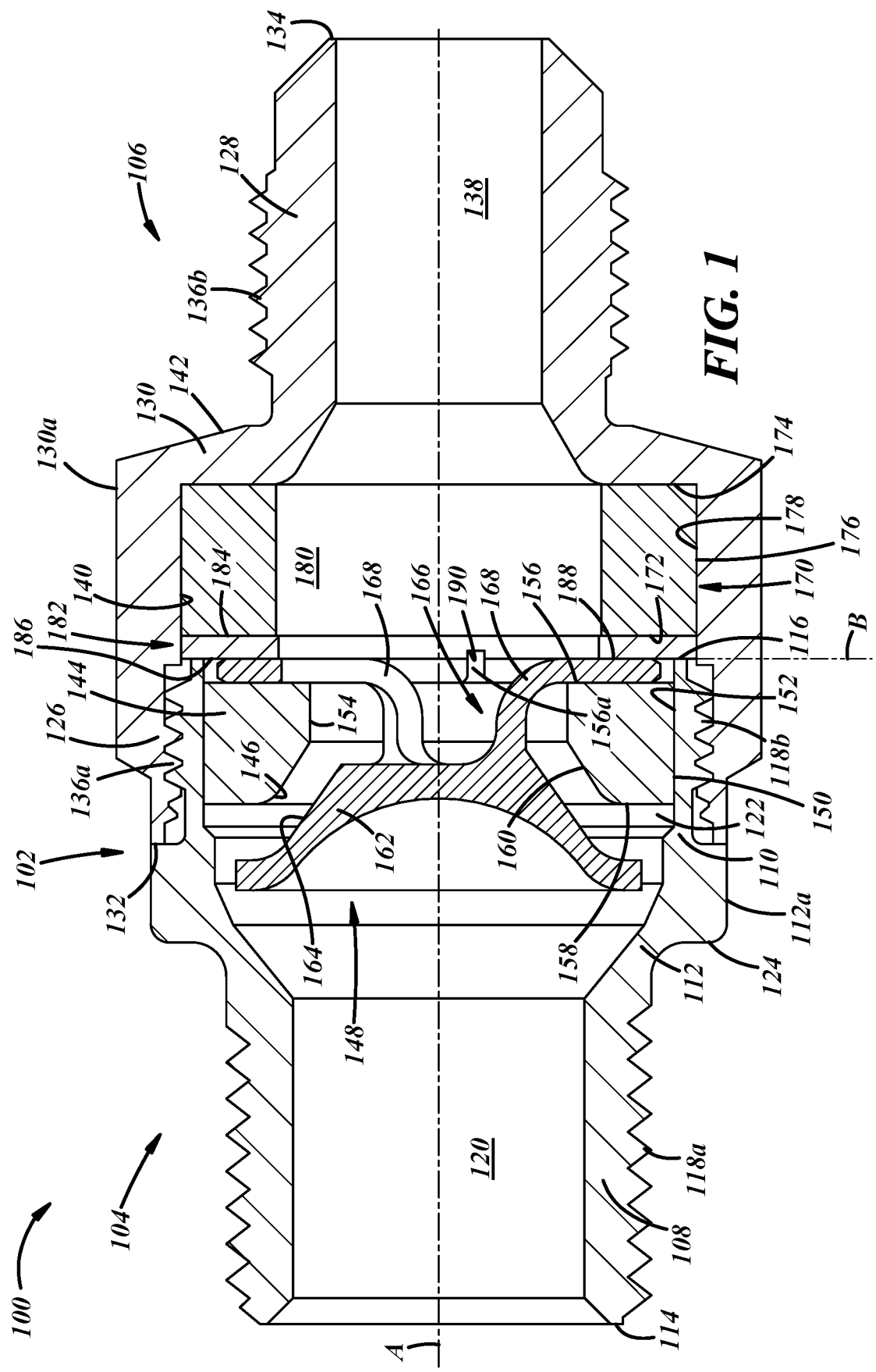
FIG. 1 is a cross-sectional view according to an illustrative embodiment of an excess flow and thermal valve assembly.

Referring specifically to the drawings, FIG. 1 shows an illustrative embodiment of an excess flow and thermal valve assembly 100 generally including a valve housing 102 that establishes a through passage that may extend along a central longitudinal axis A. The housing 102 may include an inlet fitting 104 to receive fluid from upstream fluid conduit, for instance, a pipe, hose, tube, connector, or any other conduit component(s). Also, the housing 102 may include an outlet fitting 106 coupled to the inlet fitting 104 and to transmit fluid to downstream fluid conduit, for instance, a pipe, hose, tube, connector, or any other conduit component(s). The assembly 100 further includes internal valve componentry (described below) carried by the valve housing 102, for example, by one or both of the fittings 104, 106, and to reduce flow of fluid through the assembly 100.

The assembly 100 may be used to automatically shut off, or at least reduce, flow of fluid through the assembly 100 in response to a break or disconnect in fluid conduit downstream of the assembly 100 and in response to excessive temperature. For instance, a natural gas line for a stove may include the assembly 100 to reduce escape of natural gas in the event that the line breaks or disconnects somewhere in the line downstream of the assembly 100 and/or to reduce escape of natural gas in the event of fire. Accordingly, as used herein, the terminology "reduce flow" includes reducing flow, partially shutting off flow, or completely shutting off flow.

The inlet fitting 104 may include an inlet or upstream portion 108, an outlet or downstream portion 110, and an intermediate portion 112 therebetween. The inlet fitting 104 also may include an upstream end 114 and an axially oppositely facing downstream end 116. One or both of the upstream or downstream portions 108, 110 may be at least partially cylindrical and may carry one or more conduit coupling features, for instance, one or more external threads 118a, 118b as illustrated. In other embodiments, the conduit coupling feature(s) may include one or more internal threads, or one or more internal or external bayonet features, snap lock features, clip lock features, or any other suitable conduit coupling feature(s). In the illustrated embodiment, the downstream portion 110 may have an external diameter greater than that of the upstream portion 108 and/or may have an internal diameter greater than that of the upstream portion 108. Accordingly, the upstream portion 108 may establish a throughbore 120 of the inlet fitting 104, the downstream portion 110 may establish a counterbore 122 of the inlet fitting 104, and the intermediate portion 112 may establish a shoulder 124 of the inlet fitting 104. The intermediate portion 112 may include external tool coupling features, for instance, wrench flats 112a, circumferentially spaced holes, or any other suitable tool coupling features.

The outlet fitting 106 may include an inlet or upstream portion 126, an outlet or downstream portion 128, and an intermediate portion 130 therebetween. The outlet fitting 106 also may include an upstream end 132 and an axially oppositely facing downstream end 134. One or both of the upstream or downstream portions 126, 128 may be at least partially cylindrical and may carry one or more conduit coupling features, for instance, one or more internal threads 136a on the upstream portion 126 and one or more external threads 136b on the downstream portion 128 as illustrated. In other embodiments, the conduit coupling feature(s) may include one or more external threads on the upstream portion 126 or one or more internal threads on the downstream portion 128, or one or more internal or external bayonet features, snap lock features, clip lock features, or any other suitable conduit coupling feature(s). The upstream portion 126 may have an external diameter greater than that of the downstream portion 128 and/or may have an internal diameter greater than that of the downstream portion 128, as shown in the illustrated embodiment. Accordingly, the downstream portion 128 may establish a throughbore 138 of the outlet fitting 106, the upstream portion 126 may establish a counterbore 140 of the outlet fitting 106, and the intermediate portion 130 may establish a shoulder 142 of the outlet fitting 106. The intermediate portion 130 may include tool coupling features, for instance, wrench flats 130a, circumferentially spaced holes or reliefs, or any other suitable tool coupling features.

The inlet and outlet fittings 104, 106 may be manufactured according to various techniques including forging, machining, molding, or any other techniques suitable for producing valve fittings. Also, the fittings 104, 106 may be composed of metal, for instance, brass, steel, aluminum, or iron, or any other materials suitable for use for excess flow and thermal valves.

The internal valve componentry includes a valve seat 144 carried in the housing 102 and having a valve seal surface 146, and a valve 148 carried in the housing 102 and movable against the valve seal surface 146 of the valve seat 144 to reduce flow through the assembly 100. During excess flow conditions, the valve 148 is displaced against the valve seal surface 146 of the valve seat 144 to reduce flow through the assembly 100. As used herein, the phrase "excess flow" includes, in a non-limiting example, any flow exceeding a rated trip flow for a given valve assembly, for instance, as is typically published on valve assemblies. The valve seat 144 may be annular or ring-shaped with a radially outer periphery 150 that may be in contact with a radially inner surface 152 of the inlet fitting 104, a radially inner periphery 154 through which fluid may pass, a downstream surface 156, an upstream surface 158 that may establish at least part of the valve seal surface 146, and a tapered sealing surface 160 that may establish at least part of the valve seal surface 146. The valve 148 may be a diaphragm valve including a diaphragm portion 162 that may be bowl-shaped and having a tapered sealing surface 164 corresponding to the tapered sealing surface 160 of the valve seat 144. Also, the valve 148 may have a coupling portion 166 coupled to the valve seat 144, for instance, a plurality of flexible legs 168, coupled to the downstream surface 156 of the valve seat 144. Thus far described, the valve seat 144 and valve 148 may be similar to that disclosed in U.S. Pat. No. 9,486,884, which is assigned to the assignee of the present application, and the content of which is incorporated herein by reference in its entirety.

Also, the internal valve componentry includes an intumescent 170 carried in the housing 102 on a side of the valve seat 144 axially opposite that of the diaphragm portion 162 of the valve 148. The intumescent 170 may include a separate component composed partially or entirely of intumescent material, a coating of intumescent material on one or more internal surfaces of the assembly 100, or the like. In the illustrated example, the intumescent 170 may be carried in the counterbore 122 of the upstream portion 126 of the outlet fitting 106. Also, in the illustrated example, the intumescent 170 may be annular or ring-shaped. Further, the intumescent 170 may have an upstream surface 172, a downstream surface 174 that may be in contact with an upstream facing surface 174 of the shoulder 142 of the outlet fitting 106, a radially outer surface 176 that may be in contact with a radially inner surface 178 of the upstream portion 126 of the outlet fitting 106, and/or a radially inner surface 180 through which fluid may flow. The material of the intumescent 170 may be composed of elastomeric materials, expansive agents, thermoplastic elastomers, blowing agents, and/or any other intumescent materials suitable for use in a thermal excess flow valve assembly.

Further, the internal valve componentry may include a baffle 182 carried between the intumescent 170 and the valve seat 144 to protect, locate, and/or constrain the intumescent 170, and may direct expansion of the intumescent 170, for instance, to robustly occupy negative space of the through passage or gasway in the housing 102. Also, the baffle 182 may include a rigid ring, for example, in the shape of a washer. Further, the baffle 182 may include a downstream surface 184 to contact the upstream surface 172 of the intumescent 170. Additionally, the baffle 182 may include an upstream surface 186 that may contact the downstream end 116 of the inlet fitting 104 and/or a downstream surface 188 of one or both of the valve seat 144 or valve 148. The upstream surface 186 may establish a transverse datum axis B that may be perpendicular to the central longitudinal axis A. Also, the upstream surface 186 may include one or more pockets or reliefs 190 to accept a corresponding one or more legs 156a of the valve seat 144 to help ensure that a working axis of the valve 148 is, or becomes, coaxial with the valve seat 144, thereby ensuring balanced fluid flow around the valve 148.

During excess temperature conditions, the intumescent 170 expands to reduce flow through the assembly 100. As used herein, the phrase "excess temperature" includes, in a non-limiting example, 400° F. to 800° F., including all ranges, sub-ranges, endpoints, and values therebetween. Upon expansion, the baffle 182 may at least partially restrict axial expansion of the intumescent 170 and/or direct expansion of the intumescent 170 in a radially inward direction. In any case, the expansion of the intumescent 170 completely shuts off or at least reduces flow through the assembly 100.

Figure 2:
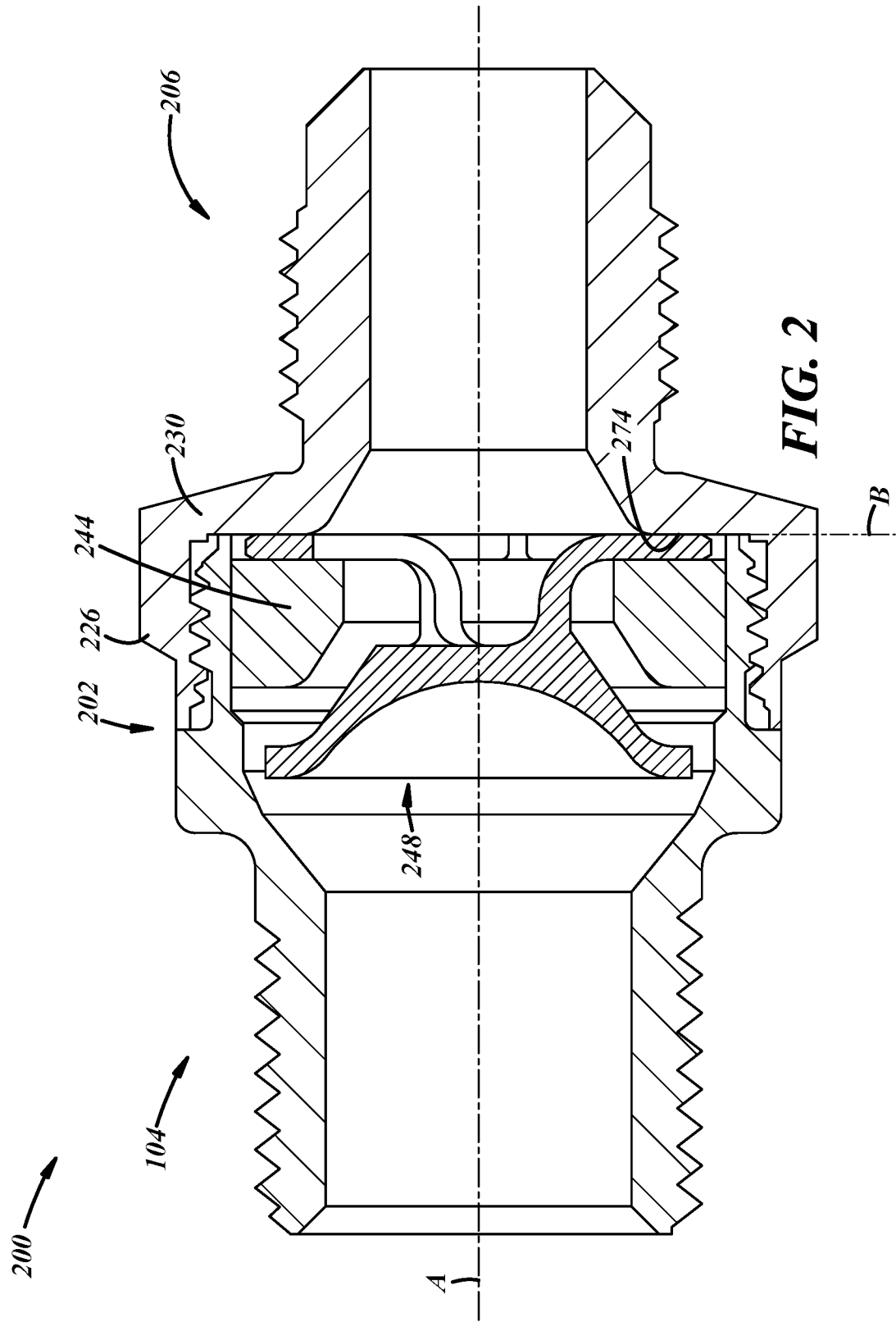
FIG. 2 is a cross-sectional view according to another illustrative embodiment of an excess flow and thermal valve assembly.

FIG. 2 illustrates another illustrative embodiment of an excess flow and thermal valve assembly 200. This embodiment is similar in many respects to the embodiment of FIG. 1. Accordingly, the descriptions of the embodiments are hereby incorporated into one another, and description of subject matter common to the embodiments generally may not be repeated.

With reference to FIG. 2, the assembly 200 generally includes a valve housing 202 carrying valve componentry including a valve seat 244 and a movable valve 248. The housing 202 may include, for example, the same inlet fitting 104 shown in FIG. 1, and an outlet fitting 206 that may be similar to the outlet fitting 106 of FIG. 1, except with an axially shorter inlet or upstream portion 226 because of the omission of a separate piece of an intumescent.

Instead, in this embodiment, the valve seat 244 is at least partially composed of intumescent material, and may be entirely composed of intumescent material. In one embodiment, the valve seat 244 may be composed of a thermoplastic elastomer prefoam to ensure an accurate and smooth sealing surface.

An upstream surface 274 of an intermediate portion 230 of the outlet fitting 206 may establish a transverse datum axis B that may be perpendicular to a central longitudinal axis A of the assembly 200. The upstream surface 274 may be a counterbore shoulder.

Figure 3:
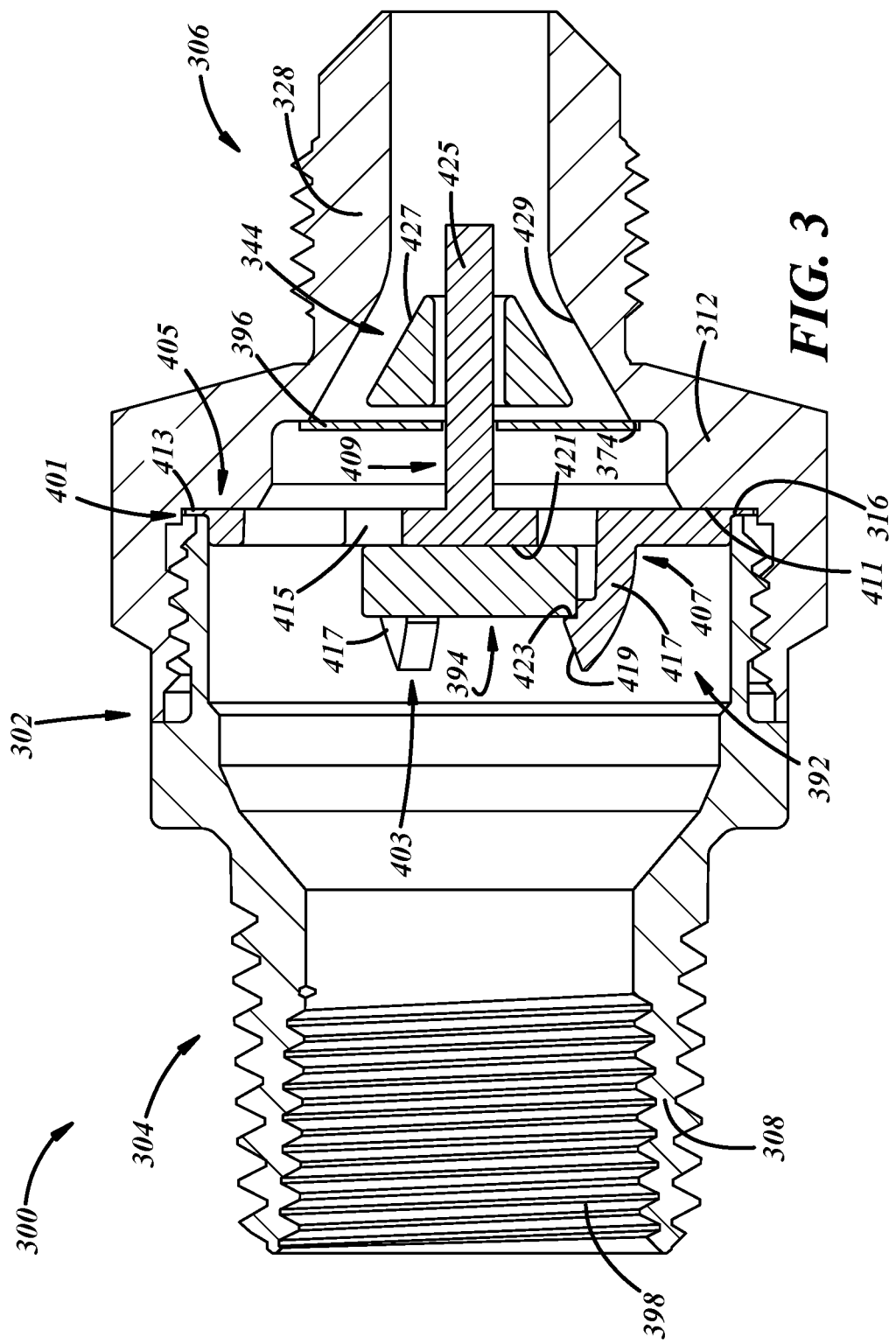
FIG. 3 is a cross-sectional view according to an additional illustrative embodiment of an excess flow and thermal valve assembly.

FIG. 3 illustrates another illustrative embodiment of an excess flow and thermal valve assembly 300. This embodiment is similar in many respects to the embodiments of FIGS. 2 and 3. Accordingly, the descriptions of the embodiments are hereby incorporated into one another, and description of subject matter common to the embodiments generally may not be repeated.

The assembly 300 generally includes a valve housing 302, and valve componentry carried in the valve housing 302 and including a retainer 392, a magnet 394 that may be retained by the retainer 392, a valve 396 that may be retained by the retainer 392, and an intumescent 344 disposed in the valve housing 302. During normal flow or no flow conditions, the magnet 394 attracts the valve 396 to a valve open position. But during excess flow conditions, the valve 396 is displaced against a corresponding surface 374 of the valve housing 302 to at least reduce flow through the assembly 300, and during excess temperature conditions, the intumescent 344 expands to at least reduce flow through the assembly 300.

The valve housing 302 includes an outlet fitting 306, and an inlet fitting 304 coupled to the outlet fitting 306. The illustrated inlet fitting 304 is substantially similar to the inlet fitting 104 of the previous embodiments, but additionally includes an internal thread 398 in an upstream portion 308 of the inlet fitting 304. The outlet fitting 306 includes a valve seat, which may include the internal upstream facing surface 374 of an intermediate portion 312 of the outlet fitting 306. The upstream facing surface 374 may be a first counterbore shoulder in the intermediate portion 312 of the outlet fitting 306.

The retainer 392 includes a radially outer periphery 401, an upstream side 403, a downstream side 405, a magnet retainer 407 on the upstream side 403 that retains the magnet 394, and a valve retainer 409 on the downstream side 405 that retains the valve 396. The retainer 392 may be axially located against an upstream facing surface 411 of the intermediate portion 312 of the outlet fitting 306, for instance a second counterbore shoulder of the intermediate portion 312. Also, the retainer 392 may be axially trapped between the inlet and outlet fittings 304, 306, for instance, via a radially extending retainer flange 413 trapped between a downstream end 316 of the inlet fitting 304 and the upstream facing surface 411 of the outlet fitting 306. Further, the retainer 392 may include a transversely extending perforate web 415, which may include a hub and spokes, a flat plate with reliefs and/or apertures therein, or any other suitable perforate web structure. The retainer 392 may be composed of polymeric material, metallic material, or any other materials suitable for use in an excess flow and thermal valve.

The magnet retainer 407 may include one or more arms 417 extending away from the web 416 in an upstream direction. The arms 417 may have inwardly tapered lead-in surfaces 419 to facilitate assembly of the magnet 394 to the retainer 392. Also, the arms 417 may include resiliently flexible bayonet arms for snap-fit retention of the magnet 394 to the retainer 392, such that the magnet 394 may be trapped between an upstream side 421 of the web 415 and downstream facing shoulders 423 of the arms 417.

The magnet 394 may be of cylindrical or puck shape, or may be of any other shape suitable for use in an excess flow and thermal valve assembly. The magnet 394 may be composed of iron, nickel, cobalt, or any other magnetic materials.

The valve 396 may be a plate of cylindrical or disc shape, or may be of any other shape suitable for use in an excess flow and thermal valve assembly. The valve 396 may be composed of steel, or any other magnetically attractable materials.

The valve retainer 409 may include a post 425 extending away from the web 416 in a downstream direction and along which the valve 396 may be movable between open and closed positions. The post 425 may be cylindrical or of any other suitable shape. Also, the post 425 may extend from a fixed end at the web 415 to a free end in a downstream portion 328 of the outlet fitting 306.

The intumescent 344 may be carried on and retained by the post 425 and, in the illustrated embodiment, the intumescent 344 is located downstream of the valve 396. The intumescent 344 may be composed of an elastomeric or rubber material that can expand and seat into a groove on the retainer 409, for example, such that the intumescent 344 and retainer 409 is an interference assembly with a clearance seating. In the illustrated embodiment, the intumescent 344 is a ring with a tapered radially outer surface 427 corresponding to a tapered radially inner surface 429 of the outlet fitting 306. The tapered surfaces 427, 429 may be straight tapered as shown in the illustrated embodiment, but may have non-straight contours in other embodiments. Also, the intumescent 344 may be cylindrical, rectangular, or of any other suitable shape.

During excess flow conditions, the valve 396 may be displaced against the counterbore shoulder 374 of the valve housing 302, and during excess temperature conditions, the intumescent 344 may expand into contact with the tapered surface 429 of the housing 302 to at least reduce flow through the assembly 300.

As used in this patent application, the terminology "for example," "for instance," "like," "such as," "comprising," "having," "including," and the like, when used with a listing of one or more elements, is open-ended, meaning that the listing does not exclude additional elements. Likewise, when preceding an element, the articles "a," "an," "the," and "said" mean that there are one or more of the elements. Moreover, directional words such as front, rear, top, bottom, upper, lower, radial, circumferential, axial, lateral, longitudinal, vertical, horizontal, transverse, and/or the like are employed by way of example and not limitation. As used herein, the term "may" is an expedient merely to indicate optionality, for instance, of an element, feature, or other thing, and cannot be reasonably construed as rendering indefinite any disclosure herein. Other terms are to be interpreted and construed in the broadest reasonable manner in accordance with their ordinary and customary meaning in the art, unless the terms are used in a context that requires a different interpretation.

Finally, the present disclosure is not a definitive presentation of an invention claimed in this patent application, but is merely a presentation of examples of illustrative embodiments of the claimed invention. More specifically, the present disclosure sets forth one or more examples that are not limitations on the scope of the claimed invention or on terminology used in the accompanying claims, except where terminology is expressly defined herein. And although the present disclosure sets forth a limited number of examples, many other examples may exist now or are yet to be discovered and, thus, it is neither intended nor possible to disclose all possible manifestations of the claimed invention. In fact, various equivalents will become apparent to artisans of ordinary skill in view of the present disclosure and will fall within the spirit and broad scope of the accompanying claims. Features of various implementing embodiments may be combined to form further embodiments of the invention. Therefore, the claimed invention is not limited to the particular examples of illustrative embodiments disclosed herein but, instead, is defined by the accompanying claims.

The invention claimed is:

1. An excess flow and thermal valve assembly, comprising:
   a valve housing;
   a valve seat carried in the valve housing, having a valve seal surface, and being at least partially composed of intumescent material; and
   a valve carried in the housing and movable against the valve seal surface of the valve seat to reduce flow of fluid through the excess flow and thermal valve assembly,
   wherein during excess flow conditions, the valve is displaceable against the valve seal surface of the valve seat to reduce flow of fluid through the excess flow and thermal valve assembly, and during excess temperature conditions, the intumescent material of the valve seat is expandable to reduce flow of fluid through the excess flow and thermal valve assembly.

2. The assembly of claim 1, wherein the valve housing includes an outlet fitting, and an inlet fitting coupled to the outlet fitting, wherein the valve seat is carried in a downstream portion of the inlet fitting.

3. The assembly of claim 2, wherein the valve seat is located against a shoulder of the outlet fitting.

4. The assembly of claim 1, wherein the valve is a diaphragm valve.

5. The assembly of claim 1, wherein the valve is coupled to the valve seat.

6. The assembly of claim 1, wherein the valve seat includes a ring of the intumescent material.

7. The assembly of claim 1, wherein the valve housing includes an outlet fitting, and an inlet fitting coupled to the outlet fitting, and wherein the valve seat is carried in a counterbore of a downstream portion of the inlet fitting.

8. The assembly of claim 1, wherein the valve housing includes an outlet fitting, and an inlet fitting coupled to the outlet fitting.

9. The assembly of claim 8, wherein the inlet fitting includes an upstream portion, a downstream portion, an intermediate portion between the upstream and downstream portions, an upstream end, and an axially oppositely facing downstream end, wherein the downstream portion has an external diameter greater than that of the upstream portion and has an internal diameter greater than that of the upstream portion, such that the upstream portion establishes a throughbore of the inlet fitting, the downstream portion establishes a counterbore of the inlet fitting, and the intermediate portion establishes a shoulder of the inlet fitting.

10. The assembly of claim 8, wherein the outlet fitting includes an upstream portion, a downstream portion, intermediate portion between the upstream and downstream portions, an upstream end, and an axially oppositely facing downstream end, wherein the upstream portion has an external diameter greater than that of the downstream portion and has an internal diameter greater than that of the downstream portion, such that the downstream portion establishes a throughbore of the outlet fitting, the upstream portion establishes a counterbore of the outlet fitting, and the intermediate portion establishes a shoulder of the outlet fitting.

11. The assembly of claim 8, wherein the valve seat is ring-shaped, and has an upstream surface, a tapered sealing surface that establishes at least part of the valve seal surface, a downstream surface in contact with a portion of the valve, a radially outer surface in contact with a radially inner surface of a downstream portion of the inlet fitting, and a radially inner surface through which fluid may flow.

12. The assembly of claim 1, wherein the excess temperature conditions include 400° F. to 800° F.

13. The assembly of claim 1, wherein the intumescent material is composed of at least one of elastomeric materials, expansive agents, thermoplastic elastomers, or blowing agents.

14. The assembly of claim 1, wherein the valve includes a bowl-shaped diaphragm portion having a tapered sealing surface corresponding to a tapered sealing surface of the valve seat.

15. The assembly of claim 1, wherein the valve has a coupling portion including plurality of flexible legs coupled to a downstream surface of the valve seat.

* * * * *